US011692517B2

(12) United States Patent
Shade et al.

(10) Patent No.: US 11,692,517 B2
(45) Date of Patent: *Jul. 4, 2023

(54) SYSTEM AND METHOD FOR DETERMINING A FUEL VAPOR CONCENTRATION IN A CANISTER OF A VEHICLE EVAPORATIVE EMISSIONS SYSTEM AND FOR EVALUATING THE CANISTER BASED ON THE FUEL VAPOR CONCENTRATION (71) Applicant: AVL TEST SYSTEMS, INC., Plymouth, MN (US)

(72) Inventors: Benjamin C. Shade, Whitmore Lake, MI (US); Jonathan Bushkuhl, Canton, MI (US)

(73) Assignee: AVL Test Systems, Inc., Plymouth, MI (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/121,659

(22) Filed: Dec. 14, 2020

(65) Prior Publication Data

US 2021/0102514 A1 Apr. 8, 2021

Related U.S. Application Data (63) Continuation of application No. 16/129,303, filed on Sep. 12, 2018, now Pat. No. 10,865,743.

(Continued)

(51) Int. Cl.
*G01M 15/04* (2006.01)
*F02M 25/08* (2006.01)

(52) U.S. Cl.
CPC ...... *F02M 25/0827* (2013.01); *F02M 25/089* (2013.01); *F02M 25/0836* (2013.01); *F02M 25/0854* (2013.01); *B01D 2253/102* (2013.01)

(58) Field of Classification Search
CPC ........... F02M 25/0827; F02M 25/0836; F02M 25/0854; F02M 25/089
See application file for complete search history.

(56) References Cited

U.S. PATENT DOCUMENTS 9,194,274 B2   11/2015   Silvis et al.
2007/0119423 A1   5/2007   Kano et al.
(Continued)

FOREIGN PATENT DOCUMENTS

DE   102012010241 A1   11/2013
JP   H6-129312 A   5/1994
(Continued)

OTHER PUBLICATIONS

Translation of Search Report dated Apr. 6, 2020 corresponding to German Patent Application No. 10 2018 128 607.4, 6 pages.
(Continued)

*Primary Examiner* — Eric S. McCall
(74) *Attorney, Agent, or Firm* — Honigman LLP; Matthew H. Szalach (57) ABSTRACT A system for testing an evaporative emissions (EVAP) canister of a vehicle according to the present disclosure includes an evaporator configured to contain liquid fuel, a fuel vapor supply line configured to deliver a mixture of fuel vapor and carrier gas from the evaporator to the EVAP canister, and a fuel vapor supply valve disposed in the fuel vapor supply line. The test system further includes a gas density meter configured to measure a density of the fuel vapor mixture flowing through the fuel vapor supply line, and a valve control module configured to control a position of the fuel vapor supply valve to adjust a flow of fuel vapor from the evaporator to the EVAP canister based on the fuel vapor mixture density.

20 Claims, 7 Drawing Sheets

Related U.S. Application Data (60) Provisional application No. 62/585,653, filed on Nov. 14, 2017.

(56) References Cited

U.S. PATENT DOCUMENTS

| | | |
|---|---|---|
| 2007/0186915 A1 | 8/2007 | Annoura |
| 2007/0266997 A1 | 11/2007 | Clontz et al. |
| 2015/0125345 A1 | 5/2015 | Kreft |
| 2018/0258530 A1 | 9/2018 | Sakaguchi et al. |
| 2019/0242786 A1 | 8/2019 | Dickow |
| 2019/0391121 A1 | 12/2019 | Williamson et al. |

FOREIGN PATENT DOCUMENTS

| | | |
|---|---|---|
| JP | H7-083130 | 3/1995 |
| JP | H7-209259 A | 8/1995 |
| JP | H7-317610 A | 12/1995 |
| JP | H8-327524 A | 12/1996 |
| KR | 100173864 | 5/1999 |

OTHER PUBLICATIONS

Reddy, S. Raghuma. SAE Technical Paper Series: 892089. "Prediction of Fuel Vapor Generation From a Vehicle Fuel Tank as a Function of Fuel RVP and Temperature". International Fuels and Lubricants Meeting and Exposition; Baltimore, Maryland; Sep. 25-28, 1989; 12 pages.

Itakura, Hideaki et al. SAE Technical Paper Series: 2000-01-0895. "Studies on Carbon Canisters to Satisfy LEVII EVAP Regulations". SAE 2000 World Congress; Detroit, Michigan; Mar. 6-9, 2000; 11 pages.

Williams, Roger S. et al. SAE Technical Paper Series: 2001-01-0733. "Impact and Control of Canister Bleed Emissions". SAE 2001 World Congress; Detroit, Michigan; Mar. 5-8, 2001; 11 pages.

Clontz, Reid et al. SAE International: SAE 2007-01-1929; Society of Automotive Engineers of Japan Inc.: JSAE 20077051. "Effects of Low-Purge Vehicle Applications and Ethanol Containing Fuels on Evaporative Emissions Canister Performance". 2007; pp. 1713-1721; 9 pages.

Reddy, Sam. SAE International: SAE 2012-01-1700. "Understanding and Designing Automotive Evaporative Emission Control Systems". Published Sep. 10, 2012; 9 pages.

Translation of Office Action dated Oct. 4, 2022 corresponding to Japanese Patent Application No. 2018-210412.

SYSTEM AND METHOD FOR DETERMINING A FUEL VAPOR CONCENTRATION IN A CANISTER OF A VEHICLE EVAPORATIVE EMISSIONS SYSTEM AND FOR EVALUATING THE CANISTER BASED ON THE FUEL VAPOR CONCENTRATION

CROSS-REFERENCE TO RELATED APPLICATIONS

This application is a continuation of U.S. application Ser. No. 16/129,303, filed on Sep. 12, 2018, which claims the benefit of U.S. Provisional Application No. 62/585,653, filed on Nov. 14, 2017. The entire disclosures of the applications referenced above are incorporated herein by reference.

FIELD

The present disclosure relates to systems and methods for determining a fuel vapor concentration in a canister of a vehicle evaporative emissions system and for evaluating the canister based on the fuel vapor concentration.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An evaporative emissions (EVAP) system of a vehicle collects fuel vapor from a fuel tank of the vehicle and directs the fuel vapor to an engine of the vehicle so that the fuel vapor is corn busted rather than being vented directly to the atmosphere. An EVAP system typically includes a canister that collects fuel vapor from the fuel tank, and lines or ducts that direct the fuel vapor from the fuel tank to the canister and from the canister to the engine. The canister typically contains activated carbon that adsorb fuel vapor within the canister. During certain engine operational modes, fresh air is drawn through the canister and carries fuel vapor from the canister to the engine.

The capacity of an EVAP canister (i.e., the amount of fuel vapor that an EVAP canister can adsorb) may vary from one EVAP canister to another EVAP canister based on factors such as the size of the EVAP canister. In addition, the capacity of an EVAP canister may vary over time as the EVAP canister is subjected to numerous cycles of adsorbing and desorbing fuel vapor. If the capacity of an EVAP canister is insufficient, a phenomenon known as breakthrough may occur where fuel vapor breaks through the EVAP canister (i.e., passes through the EVAP canister without being adsorbed) and is vented to the atmosphere.

Systems and methods have been developed for evaluating the performance of an EVAP canister including the capacity of an EVAP canister. However, these systems and methods do not test an EVAP canister as accurately as possible.

SUMMARY

A system for testing an evaporative emissions (EVAP) canister of a vehicle according to the present disclosure includes an evaporator configured to contain liquid fuel, a fuel vapor supply line configured to deliver a mixture of fuel vapor and carrier gas from the evaporator to the EVAP canister, and a fuel vapor supply valve disposed in the fuel vapor supply line. The test system further includes a gas density meter configured to measure a density of the fuel vapor mixture flowing through the fuel vapor supply line, and a valve control module configured to control a position of the fuel vapor supply valve to adjust a flow of fuel vapor from the evaporator to the EVAP canister based on the fuel vapor mixture density.

In one example, the test system further includes a fuel vapor concentration module configured to determine a concentration of fuel vapor in the fuel vapor mixture based on the fuel vapor mixture density, and the valve control module is configured to control the position of the fuel vapor supply valve based on the fuel vapor concentration.

In one example, the valve control module is configured to adjust the position of the fuel vapor supply valve to supply fuel vapor to the EVAP canister during N cycles of a canister test. N is an integer greater than one. In this example, the valve control module is also configured to determine N based on the fuel vapor concentration.

In one example, the valve control module is configured to open the fuel vapor supply valve to start the N cycles when the valve control module is fuel vapor concentration is less than or equal to a first predetermined percentage.

In one example, the valve control module is configured to close the fuel vapor supply valve to end the N cycles when the fuel vapor concentration is less than or equal to a second predetermined percentage.

In one example, the test system further includes a liquid fuel drain line configured to drain liquid fuel from the evaporator, and a liquid fuel drain valve disposed in the liquid fuel drain line. In this example, the valve control module is configured to open the liquid fuel drain valve to drain the evaporator when the fuel vapor concentration is less than or equal to the second predetermined percentage.

In one example, the test system further includes a breakthrough canister, a fuel vapor breakthrough line configured to deliver fuel vapor from the EVAP canister to the breakthrough canister, a breakthrough canister scale configured to measure a mass of the breakthrough canister including contents thereof, and a fuel vapor mass module configured to determine a mass of fuel vapor in the breakthrough canister based on the breakthrough canister mass. In this example, the valve control module is configured to close the fuel vapor supply valve to end each of the N cycles when the fuel vapor mass is greater than or equal to a predetermined mass.

In one example, the test system further includes an EVAP canister scale configured to measure a mass of the EVAP canister including contents thereof, and a mass flow rate module configured to determine a mass flow rate of fuel vapor flowing through the fuel vapor supply line based on the breakthrough canister mass and the EVAP canister mass. In this example, the fuel vapor concentration module is configured to determine the fuel vapor concentration further based on the fuel vapor mass flow rate.

In one example, the test system further includes a carrier gas supply line configured to supply the carrier gas to the evaporator, and a flow meter configured to measure a volumetric flow rate of the carrier gas flowing through the carrier gas supply line. In this example, the fuel vapor concentration module is configured to determine the fuel vapor concentration further based on the carrier gas volumetric flow rate and a density of the carrier gas.

In one example, the valve control module is configured to control the position of the fuel vapor supply valve to prevent fuel vapor flow through the fuel vapor supply line and to allow a purge gas to flow through the fuel vapor supply line to purge the gas density meter between consecutive ones of the N cycles.

In one example, the gas density meter is configured to measure a density of the purge gas, and the test system further includes a contamination detection module configured to determine that the gas density meter is contaminated when the purge gas density is outside of a predetermined range.

A second system for performing a test on an EVAP canister of a vehicle according to the present disclosure includes an evaporator configured to contain liquid fuel, a fuel vapor supply line configured to deliver a mixture of fuel vapor and a carrier gas from the evaporator to the EVAP canister, and a fuel vapor supply valve disposed in the fuel vapor supply line. The second test system further includes a fuel vapor concentration module configured to estimate a concentration of fuel vapor in the fuel vapor mixture flowing through the fuel vapor supply line, and a valve control module configured to control a position of the fuel vapor supply valve to adjust a flow of fuel vapor from the evaporator to the EVAP canister based on the fuel vapor concentration.

In one example, the second test system further includes a weathering coefficient module configured to determine a weathering coefficient of liquid fuel in the evaporator, wherein the fuel vapor concentration module is configured to estimate the fuel vapor concentration based on the weathering coefficient.

In one example, the fuel vapor concentration module is configured to estimate the fuel vapor concentration further based on a temperature of liquid fuel in the evaporator, a Reid vapor pressure of liquid fuel in the evaporator, a decrease in a mass of liquid fuel in the evaporator over a period since a start of the test, and a pressure in the evaporator.

In one example, the second test system further includes an evaporator scale configured to measure a mass of the evaporator, and a liquid fuel mass module configured to determine the decrease in the mass of liquid fuel in the evaporator over the period since the start of the test based on the evaporator mass.

In one example, the second test system further includes a liquid fuel level sensor configured to measure a level of liquid fuel in the evaporator, a liquid fuel density sensor configured to measure a density of liquid fuel in the evaporator, and a liquid fuel mass module configured to determine the decrease in the mass of liquid fuel in the evaporator over the period since the start of the test based on the liquid fuel level and the liquid fuel density.

In one example, the second test system further includes a gas density meter configured to measure a density of the fuel vapor mixture flowing through the fuel vapor supply line, wherein the weathering coefficient module is configured to determine the weathering coefficient based on the fuel vapor mixture density.

In one example, the weathering coefficient module is configured to determine the weathering coefficient further based on a temperature of liquid fuel in the evaporator, a Reid vapor pressure of liquid fuel in the evaporator, a decrease in a mass of liquid fuel in the evaporator over a period since a start of the test, and a pressure in the evaporator.

In one example, the fuel vapor concentration module is configured to determine the fuel vapor concentration before the test based on the fuel vapor mixture density, and the weathering coefficient module is configured to determine the weathering coefficient based on the fuel vapor mixture density determined before the test.

In one example, the fuel vapor concentration module is configured to estimate the fuel vapor concentration during the test based on the weathering coefficient and independent of the fuel vapor mixture density.

In one example, the second test system further includes an EVAP canister scale configured to measure a mass of the EVAP canister, and a mass flow rate module configured to determine a mass flow rate of fuel vapor flowing through the fuel vapor supply line based on the EVAP canister mass. In this example, the fuel vapor concentration module is configured to determine the fuel vapor concentration before the test further based on the fuel vapor mass flow rate.

In another example, the second test system further includes a carrier gas supply line configured to supply the carrier gas to the evaporator, and a flow meter configured to measure a volumetric flow rate of the carrier gas flowing through the carrier gas supply line. In this example, the fuel vapor concentration module is configured to determine the fuel vapor concentration before the test further based on the carrier gas volumetric flow rate and a density of carrier gas flowing through the carrier gas supply line.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A typical system for testing a canister of an EVAP system includes an evaporator that contains liquid fuel and a carrier gas source that supplies carrier gas (e.g., ambient air or nitrogen) to the evaporator. During each cycle of a test, a mixture of fuel vapor and carrier gas is delivered from an evaporator to the canister until a predetermined mass (e.g., 2 grams) of fuel vapor breaks through the canister. The canister is loaded with the fuel vapor mixture a rate that is within a predetermined range (e.g., 40 to 80 grams per hour).

When the predetermined mass of fuel vapor breaks through the canister, purge gas (e.g., ambient air) is directed through the canister to purge the canister of fuel vapor, and then another cycle may be started. A predetermined number of cycles are performed during each test, and the evaporator is drained and refilled after each test. Once a predetermined number of tests have been performed on the canister, the canister is installed on a vehicle, and the level of emissions produced by an engine of the vehicle is measured to evaluate the performance of the canister.

Although the performance of a canister may not be measured until the canister is installed on a vehicle, the process of loading the canister with fuel vapor may be considered part of the canister evaluation since that process may affect the performance of the canister. More specifically, the concentration of fuel vapor in the fuel vapor mixture sent to the canister may affect the performance of the canister. Thus, it is desired that the concentration of fuel vapor in the fuel vapor mixture is within a predetermined range, such a 35 percent to 65 percent of fuel vapor by volume, to ensure consistent test conditions. This criterion is typically satisfied by making assumptions about the fuel vapor concentration at a given temperature and carrier gas flow rate. In other words, it is assumed that the fuel vapor concentration is within the predetermined range as long as the fuel vapor temperature and the carrier gas flow rate are maintained within certain ranges.

In addition, at a given fuel temperature and pressure, the fuel vapor concentration decreases as the level of liquid fuel in the evaporator decreases. Thus, as the test progresses and the level of liquid fuel in the evaporator decreases due to evaporation, there is a greater risk that the fuel vapor concentration is not within the predetermined range. Since the actual fuel vapor concentration is unknown, the number of cycles typically performing during a test before draining and refilling the evaporator is typically a conservative value (e.g., 2).

The assumptions about fuel vapor concentration do not account for fuel weather or deterioration. Fuel weathering refers to the properties of a fuel changing over time due to evaporation or distillation. During evaporation, a fuel loses lower density substances (e.g., butane, propane, pentane) first, and then the fuel loses higher density substances (e.g., octane, nonane, decane). In addition, different types of fuels weather at different rates. For example, more volatile fuels are more likely to lose lower density substances faster than less volatile fuels. Thus, in a vessel containing fuel and fuel vapor, the density of the fuel vapor is affected by fuel weathering, which may cause the concentration of fuel vapor in the fuel vapor mixture sent to the canister to be outside of the desired or predetermined range.

A system and method for evaluating the durability and/or performance of a canister according to the present disclosure determines fuel vapor concentration in a way that accounts for fuel weathering and therefore ensures that a fuel vapor mixture sent to the canister is within the desired range. In one example, the system includes a gas density meter that measures the density of the fuel vapor mixture, and the system and method determines the concentration of fuel vapor in the fuel vapor mixture based on the gas density. In another example, the system and method determines a weathering coefficient of a fuel based on the density of the fuel vapor mixture, and then uses the weathering coefficient to estimate the fuel vapor concentration independent of the density when using the same type of fuel. An advantage of this latter example is that the gas density meter may be removed from the system once the weathering coefficient is determined, which avoids test interruptions due to contamination of the gas density meter.

In addition, since the fuel vapor concentration is determined, the system and method can perform a greater number of cycles during each test before draining and refilling the evaporator while ensuring that the fuel vapor mixture is within the desired range. In one example, rather than performing a predetermined number of cycles during each test, the system and method performs cycles until the fuel vapor concentration is at or near the lowest value of the desired range. In this manner, the system and method reduces the amount of fuel that is used to evaluate the canister, which reduces the cost of the evaluation.

Figure 1:
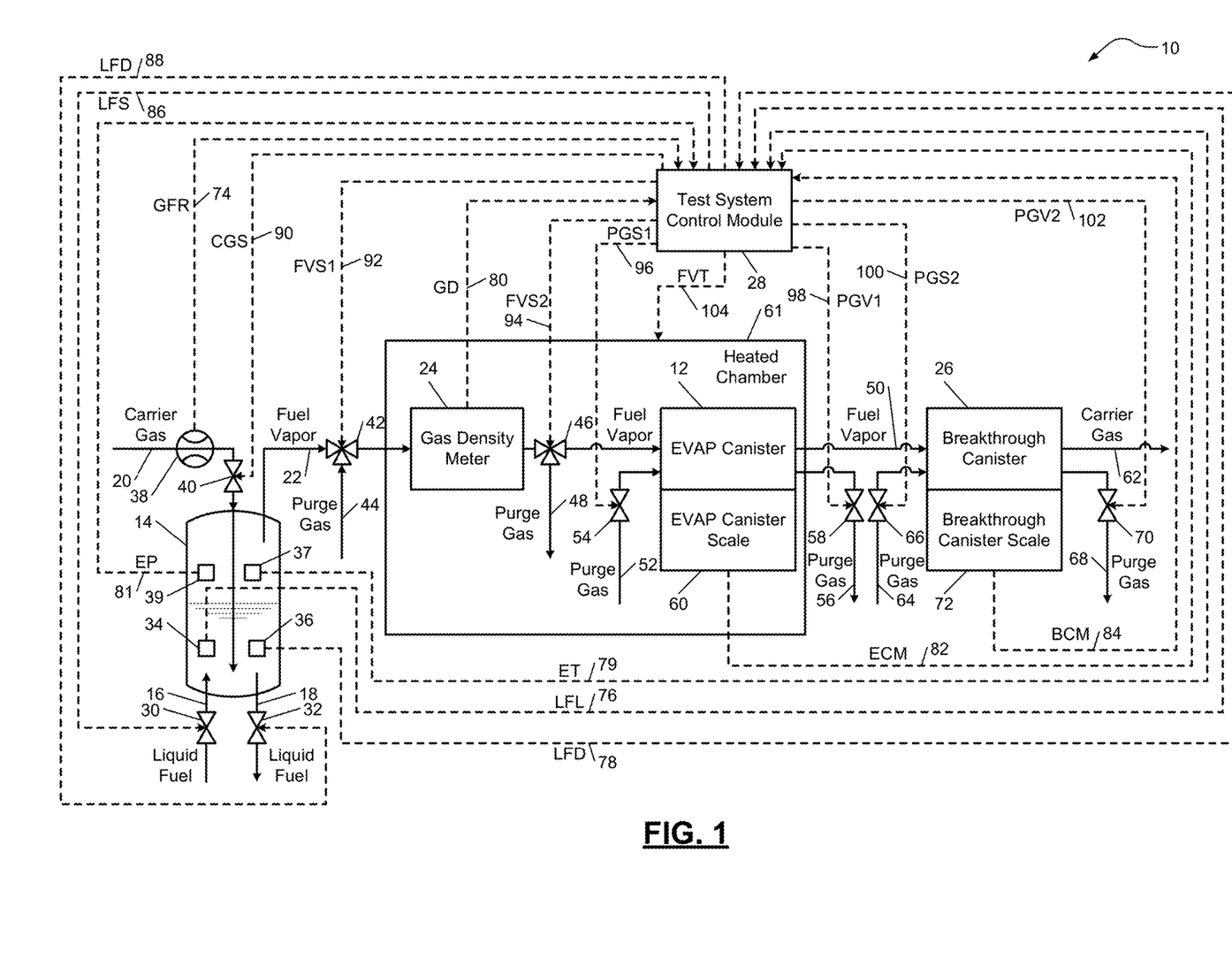
FIG. 1 is a functional block diagram of an example system for testing an EVAP canister of a vehicle according to the principles of the present disclosure.

Referring now to FIG. 1, a test system 10 for testing an EVAP canister 12 includes an evaporator 14, a liquid fuel supply line 16, a liquid fuel drain line 18, a carrier gas supply line 20, a fuel vapor supply line 22, a gas density meter 24, a breakthrough canister 26, and a test system control module 28. The evaporator 14 may be a heated vessel with a liquid fuel storage capacity of 1 liter to 5 liters. Liquid fuel is supplied to the evaporator 14 through the liquid fuel supply line 16. A liquid fuel supply valve 30 is disposed in the liquid fuel supply line 16 and regulates the flow of liquid fuel through the liquid fuel supply line 16. Liquid fuel is drained from the evaporator 14 through the liquid fuel drain line 18. A liquid fuel drain valve 32 is disposed in the liquid fuel drain line 18 and regulates the flow of liquid fuel through the liquid fuel drain line 18.

A liquid fuel level sensor 34, a liquid fuel density sensor 36, an evaporator temperature sensor 37, and an evaporator pressure sensor 39 are mounted on or within the evaporator 14. The liquid fuel level sensor 34 measures the level (or volume) of liquid fuel in the evaporator 14. The liquid fuel density sensor 36 measures the density of liquid fuel in the evaporator 14. The evaporator temperature sensor 37 measures the temperature of fuel vapor the evaporator 14, which may be referred to as the evaporator temperature. The evaporator pressure sensor 39 measures the pressure within the evaporator 14.

During a test, a carrier gas (e.g., ambient air, nitrogen) is supplied to the evaporator 14 through the carrier gas supply line 20. In turn, a mixture of the carrier gas and fuel vapor flows from the evaporator 14 to the EVAP canister 12 through the fuel vapor supply line 22. A flow meter 38 is disposed in the carrier gas supply line 20 and measures the volumetric flow rate of carrier gas flowing through the carrier gas supply line 20. A carrier gas supply valve 40 is disposed in the carrier gas supply line 20 downstream of the flow meter 38 and regulates the flow of carrier gas through the carrier gas supply line 20.

A first fuel vapor supply valve 42 is disposed in the fuel vapor supply line 22 and regulates the flow of the fuel vapor mixture (i.e., the mixture of the carrier gas and fuel vapor) through the fuel vapor supply line 22. In the example shown, the first fuel vapor supply valve 42 is a three way valve. In a first position, the first fuel vapor supply valve 42 allows the fuel vapor mixture to flow from the evaporator 14 to the EVAP canister 12 and prevents the flow of purge gas (e.g., ambient air, nitrogen) from a first purge gas supply line 44 to the EVAP canister 12. In a second position, the first fuel vapor supply valve 42 prevents the flow of the fuel vapor mixture from the evaporator 14 to the EVAP canister 12 and allows purge gas to flow from the first purge gas supply line 44 to the EVAP canister 12. The gas density meter 24 is disposed in the fuel vapor supply line 22 downstream of the first fuel vapor supply valve 42 and measures the density of gas (e.g., carrier gas, fuel vapor mixture, purge gas) flowing through the fuel vapor supply line 22.

A second fuel vapor supply valve 46 is disposed in the fuel vapor supply line 22 downstream of the gas density meter 24 and regulates the flow of the fuel vapor mixture through the fuel vapor supply line 22. In the example shown, the second fuel vapor supply valve 46 is a three way valve. In a first position, the second fuel vapor supply valve 46 allows the fuel vapor mixture to flow from the evaporator 14 to the EVAP canister 12 and prevents gas flow through a first purge gas vent line 48. In a second position, the second fuel vapor supply valve 46 prevents gas flow from the evaporator 14 to the EVAP canister 12 and allows gas (e.g., purge gas) to flow through the first purge gas vent line 48.

During a test, the EVAP canister 12 collects fuel vapor from the fuel vapor mixture that flows from the evaporator 14 to the EVAP canister 12, while the carrier gas in the fuel vapor mixture passes through the EVAP canister 12, a breakthrough line 50, and the breakthrough canister 26. The EVAP canister 12 continues to accumulate fuel vapor from the fuel vapor mixture (i.e., the amount of fuel vapor collected in the EVAP canister 12 continues to increase) until the EVAP canister 12 is full (i.e., the amount of fuel vapor collected in the EVAP canister 12 is equal to the storage capacity of the EVAP canister 12). When the EVAP canister 12 is full, both the fuel vapor and the carrier gas in the fuel vapor mixture flows from the EVAP canister 12 to the breakthrough canister 26 through the breakthrough line 50. Fuel vapor that flows from the EVAP canister 12 to the breakthrough canister 26 may be referred to as breakthrough fuel vapor since it breaks through the EVAP canister 12 (i.e., passes through the EVAP canister 12 without being adsorbed). When the EVAP canister 12 is not full, ideally no fuel vapor from the fuel vapor mixture flows from the EVAP canister 12 to the breakthrough canister 26 (i.e., only the carrier gas in the fuel vapor mixture flows from the EVAP canister 12 to the breakthrough canister 26).

A second purge gas supply line 52 supplies purge gas to the EVAP canister 12. A first purge gas supply valve 54 is disposed in the second purge gas supply line 52 and regulates the flow of purge gas through the second purge gas supply line 52. A second purge gas vent line 56 vents purge gas from the EVAP canister 12. A first purge gas vent valve 58 is disposed in the second purge gas vent line 56 and regulates the flow of purge gas through the second purge gas vent line 56. The EVAP canister 12 rests on an EVAP canister scale 60 that measures the mass of the EVAP canister 12 and/or the mass of the contents of the EVAP canister 12 (e.g., the mass of fuel vapor collected in the EVAP canister 12). In one example, the output of the EVAP canister scale 60 is set to zero when the EVAP canister 12 is resting on the EVAP canister scale 60 and is empty, and therefore the output of the EVAP canister scale 60 is the mass of the contents of the EVAP canister 12. In this example, the measurement made by the EVAP canister scale 60 may still include the mass of the EVAP canister 12 even though the output of the EVAP canister scale 60 is zero when the EVAP canister 12 is empty since the mass of the EVAP canister 12 affects the measurement (e.g., the output of the EVAP canister scale 60 would be negative if the EVAP canister 12 were removed from the EVAP canister scale 60).

In the example shown, the gas density meter 24, the EVAP canister 12, the EVAP canister scale 60, and portions of the fuel vapor supply line 22 and the breakthrough line 50 are disposed within a heated chamber 61. In addition, the fuel vapor supply line 22 may be a heated line and, as noted above, the evaporator 14 may be a heated vessel. The evaporator 14, the fuel vapor supply line 22, and/or the heated chamber 61 heat fuel vapor contained therein to a target temperature. The target temperature may be a predetermined temperature (e.g., 40 degrees Celsius) and/or may be greater than the dew point of the fuel vapor.

The breakthrough canister 26 collects fuel vapor from the fuel vapor mixture that flows from the EVAP canister 12 to the breakthrough canister 26, while the carrier gas in the fuel vapor mixture exits the breakthrough canister 26 through a carrier gas vent line 62. The amount of fuel vapor collected in the breakthrough canister 26 continues to increase until the breakthrough canister 26 is full (i.e., the amount of fuel vapor collected in the breakthrough canister 26 is equal to the storage capacity of the breakthrough canister 26). If the breakthrough canister 26 were to become full, both the fuel vapor and the carrier gas in the fuel vapor mixture would flow out of the breakthrough canister 26 through the carrier gas vent line 62. However, during a test, the breakthrough canister 26 is typically purged before the breakthrough canister 26 becomes full, and therefore fuel vapor typically does not flow through the carrier gas vent line 62. When the breakthrough canister 26 is not full, no fuel vapor flows out of the breakthrough canister 26 through the carrier gas vent line 62 (i.e., only the carrier gas in the fuel vapor mixture flows out of the breakthrough canister 26 through the carrier gas vent line 62).

A third purge gas supply line 64 supplies purge gas to the breakthrough canister 26. A second purge gas supply valve 66 is disposed in the third purge gas supply line 64 and regulates the flow of purge gas through the third purge gas supply line 64. A second purge gas vent line 68 vents purge gas from the breakthrough canister 26. A second purge gas vent valve 70 is disposed in the second purge gas vent line 68 and regulates the flow of purge gas through the second purge gas vent line 68. The breakthrough canister 26 rests on a breakthrough canister scale 72 that measures the mass of the breakthrough canister 26 and/or the mass of the contents of the breakthrough canister 26 (e.g., the mass of fuel vapor collected in the breakthrough canister 26). In one example, the output of the breakthrough canister scale 72 is set to zero when the breakthrough canister 26 is resting on the breakthrough canister scale 72 and is empty, and therefore the output of the breakthrough canister scale 72 is the mass of the contents of the breakthrough canister 26. In this example, the measurement made by the breakthrough canister scale 72 may still include the mass of the breakthrough canister 26 even though the output of the breakthrough canister scale 72 is zero when the breakthrough canister 26 is empty since the mass of the breakthrough canister 26 affects the measurement (e.g., the output of the breakthrough canister scale 72 would be negative if the breakthrough canister 26 were removed from the breakthrough canister scale 72).

A test may include several cycles during which fuel vapor is supplied to the EVAP canister 12, and each cycle of the test may end when the mass of fuel vapor collected in the breakthrough canister 26 is greater than or equal to a first mass (e.g., 2 grams), which may be predetermined. The first mass may be less than the storage capacity of the breakthrough canister 26. Therefore, no fuel vapor may flow out of the breakthrough canister 26 through the fuel vapor vent line 62 during a test.

The test system control module 28 receives signals generated by sensors in the test system 10. The flow meter 38 generates a gas flow rate (GFR) signal 74 indicating the volumetric flow rate of carrier gas flowing through the carrier gas supply line 20 and outputs the GFR signal 74 to the test system control module 28. The liquid fuel level sensor 34 generates a liquid fuel level (LFL) signal 76 indicating the level of liquid fuel in the evaporator 14 and outputs the LFL signal 76 to the test system control module 28. The liquid fuel density sensor 36 generates a liquid fuel density (LFD) signal 78 indicating the density of liquid fuel in the evaporator 14 and outputs the LFD signal 78 to the test system control module 28. The evaporator temperature sensor 37 generates a evaporator temperature (ET) signal 79 indicating the temperature of fuel vapor in the evaporator 14 and outputs the ET signal 79 to the test system control module 28. The evaporator pressure sensor 39 generates an evaporator pressure (EP) signal 81 indicating the pressure in the evaporator 14 and outputs the EP signal 81 to the test system control module 28.

The gas density meter 24 generates a gas density (GD) signal 80 indicating the density of gas flowing through the fuel vapor supply line 22 and outputs the GD signal 80 to the test system control module 28. The EVAP canister scale 60 generates an EVAP canister mass (ECM) signal 82 indicating the mass of the EVAP canister 12 and/or its contents, and outputs the ECM signal 82 to the test system control module 28. The mass of the EVAP canister 12 and/or its contents is referred to herein as the EVAP canister mass. The breakthrough canister scale 72 generates a breakthrough canister mass (BCM) signal 84 indicating the mass of the breakthrough canister 26 and/or its contents, and outputs the BCM signal 84 to the test system control module 28. The mass of the breakthrough canister 26 and/or its contents is referred to herein as the breakthrough canister mass.

The test system control module 28 generates control signals to control components of the test system 10 based on the sensor signals. The test system control module 28 generates a liquid fuel supply (LFS) signal 86 to control the position of the liquid fuel supply valve 30. The test system control module 28 generates a liquid fuel drain (LFD) signal 88 to control the position of the liquid fuel drain valve 32.

The test system control module 28 generates a carrier gas supply (CGS) signal 90 to control the position of the carrier gas supply valve 40. The test system control module 28 generates a first fuel vapor supply (FVS1) signal 92 to control the position of the first fuel vapor supply valve 42. The test system control module 28 generates a second fuel vapor supply (FVS2) signal 94 to control the position of the second fuel vapor supply valve 46.

The test system control module 28 generates a first purge gas supply (PGS1) signal 96 to control the position of the first purge gas supply valve 54. The test system control module 28 generates a first purge gas vent (PGV1) signal 98 to control the position of the first purge gas vent valve 58. The test system control module 28 generates a second purge gas supply (PGS2) signal 100 to control the position of the second purge gas supply valve 66. The test system control module 28 generates a second purge gas vent (PGV2) signal 102 to control the position of the second purge gas vent valve 70.

The test system control module 28 generates a heater control (HC) signal 104 to control the temperature of the fuel vapor supply line 22 and/or the heated chamber 61, and thereby control the temperature of fuel vapor contained therein. In various implementations, the test system control module 28 may generate a first HC signal to control the temperature of the fuel vapor supply line 22 and generate a second HC signal to control the temperature of the heated chamber 61. Thus, the test system control module 28 may control the temperature of the heated chamber 61 independent of controlling the temperature of the fuel vapor supply line 22 and vice versa.

Figure 2:
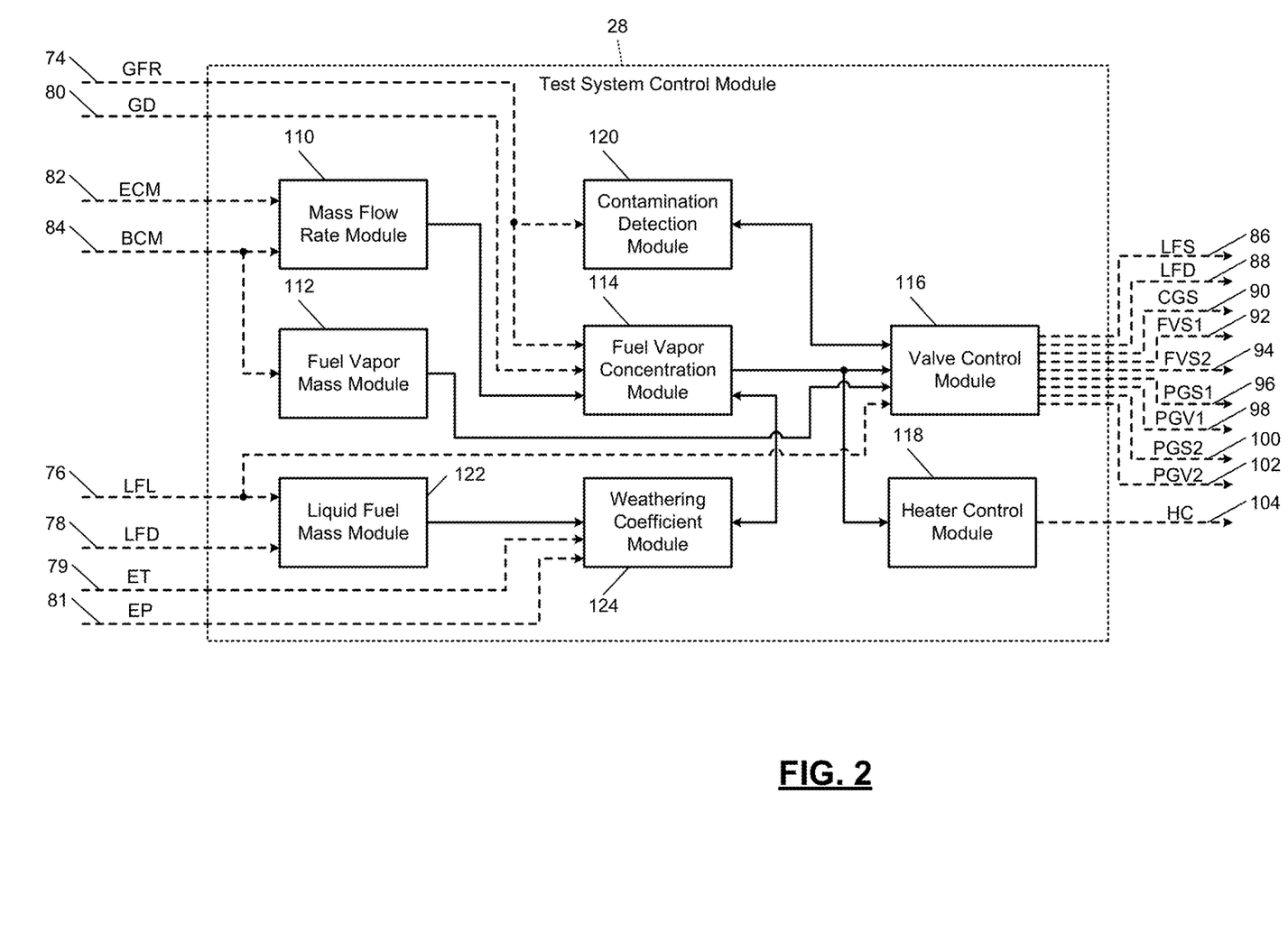
FIG. 2 is a functional block diagram of an example test system control module according to the principles of the present disclosure.

Referring now to FIG. 2, an example of the test system control module 28 includes a mass flow rate module 110, a fuel vapor mass module 112, a fuel vapor concentration module 114, a valve control module 116, and a heater control module 118. The mass flow rate module 110 determines the mass flow rate of fuel vapor flowing through the fuel vapor supply line 22. The mass flow rate module 110 determines the fuel vapor mass flow rate based on the EVAP canister mass indicated by the ECM signal 82 and/or the breakthrough canister mass indicated by the BCM signal 84. In one example, the mass flow rate module 110 sets the fuel vapor mass flow rate equal to a sum of a rate of change in the EVAP canister mass and a rate of change in the breakthrough canister mass. The mass flow rate module 110 outputs the fuel vapor mass flow rate.

The fuel vapor mass module 112 determines the mass of fuel vapor in the breakthrough canister 26 based on the breakthrough canister mass indicated by the BCM signal 84. In one example, the fuel vapor mass module 112 sets the fuel vapor mass equal to zero when the breakthrough canister 26 is purged and/or at the beginning of a test. Then, during the test, the fuel vapor mass module 112 sets the fuel vapor mass equal to a difference between the current breakthrough canister mass and the breakthrough canister mass at the beginning of the test. The fuel vapor mass module 112 outputs the fuel vapor mass.

The fuel vapor concentration module 114 determines the concentration of fuel vapor in the fuel vapor mixture flowing through the fuel vapor supply line 22. The fuel vapor concentration module 114 determines the fuel vapor concentration based on volumetric flow rate of carrier gas indicated by the GFR signal 74, the fuel vapor mass flowrate, and the density of the fuel vapor mixture indicated by the GD signal 80. In one example, the fuel vapor concentration module 114 determines the fuel vapor concentration using a relationship such as $$\theta_{FV} = 1 - \frac{\dot{V}_{CG}}{\left[\frac{(\dot{m}_{FV} + \rho_{CG} * \dot{V}_{CG})}{\rho_{FV}}\right]} \quad (1)$$

where $\theta_{FV}$ is the fuel vapor concentration, $\dot{V}_{CG}$ is the carrier gas volumetric flow rate (e.g., in liters per minute), $\dot{m}_{FV}$ is the fuel vapor mass flow rate (e.g., in grams per hour), $\rho_{CG}$ is the density of the carrier gas (e.g., in grams per liter), and $\rho_{FV}$ is the fuel vapor mixture density (e.g., in grams per liter). The carrier gas density may be predetermined. The fuel vapor concentration module 114 outputs the fuel vapor concentration.

The heater control module 118 generates the HC signal 104 to control one or more heaters in the evaporator 14, the fuel vapor supply line 22, and/or the heated chamber 61, and thereby control the temperature of fuel vapor contained therein. The heater control module 118 controls the heaters based on the fuel vapor concentration. In one example, the heater control module 118 controls the heaters to increase the temperature of fuel vapor in the evaporator 14 when the fuel vapor concentration is less than a first percentage (e.g., 65 percent), which may be predetermined.

The valve control module 116 generates control signals to control the positions of the valves in the test system 10. The control signals generated by the valve control module 116 include the LFS signal 86, the LFD signal 88, the CGS signal 90, the FVS1 signal 92, the FVS2 signal 92, the PGS1 signal 96, the PGV1 signal 98, the PGS2 signal 100, and the PGV2 signal 102. The valve control module 116 controls the carrier gas supply valve 40 and the first and second fuel vapor supply valves 42 and 46 based on the mass of fuel vapor in the breakthrough canister 26. In one example, the valve control module 116 opens the carrier gas supply valve 40 and adjusts the first and second fuel vapor supply valves 42 and 46 to their respective first positions to supply fuel vapor to the EVAP canister 12 during each cycle of a test. When the fuel vapor mass is greater than or equal to a first mass (e.g., 2 grams), the valve control module 116 closes the carrier gas supply valve 40 and adjusts the first and second fuel vapor supply valves 42 and 46 to their respective second positions to flow purge gas through the gas density meter 24 and end the cycle. The first mass may be predetermined.

The valve control module 116 controls the liquid fuel supply valve 30, the liquid fuel drain valve 32, the carrier gas supply valve 40, the first fuel vapor supply valve 42, and/or the second fuel vapor supply valve 46 based on the fuel vapor concentration. In one example, the valve control module 116 opens the carrier gas supply valve 40 and adjusts the first and second fuel vapor supply valves 42 and 46 to their respective first positions to supply fuel vapor to the EVAP canister 12 during each cycle of a test. The valve control module 116 continues to execute cycles until the fuel vapor concentration is less than or equal to a second percentage (e.g., 35 percent), which may be predetermined. At that point, the valve control module 116 closes the carrier gas supply valve 40 to end the test, and adjusts the first and second fuel vapor supply valves 42 and 46 to their respective second positions to flow purge gas through the gas density meter 24. In addition, the valve control module 116 opens the liquid fuel drain valve 32 to drain the EVAP canister 12, and then opens the liquid fuel supply valve 30 to refill the EVAP canister 12 to a first level (e.g., 2 liters), which may be predetermined. The valve control module 116 receives the evaporator liquid fuel level via the LFL signal 76.

The example implementation of the test system control module 28 shown in FIG. 2 further includes a contamination detection module 120, a liquid fuel mass module 122, and a weathering coefficient module 124. The contamination detection module 120 determines whether the gas density meter 24 is contaminated based on the gas density indicated by the GD signal 80 when purge gas is flowing through the gas density meter 24. In one example, the contamination detection module 120 determines that the gas density meter 24 is contaminated when the density of the purge gas measured by the gas density meter 24 is outside of a predetermined or expected range.

The valve control module 116 outputs a signal to the contamination detection module 120 indicating when purge gas is flowing through the gas density meter 24. The contamination detection module 120 outputs a signal to the valve control module 116 indicating whether the gas density meter 24 is contaminated. When the gas density meter 24 is contaminated, the valve control module 116 may close the carrier gas supply valve 40 and adjust the first and second fuel vapor supply valves 42 and 46 to their respective second positions to flow purge gas through the gas density meter 24 and end a test.

The liquid fuel mass module 122 determines the mass of liquid fuel in the evaporator 14 at the start of a test and at predetermined time intervals during the test. The liquid fuel mass module 122 subtracts the liquid fuel mass at the start of the test from the liquid fuel mass during the test to obtain the mass of liquid fuel lost (i.e., a decrease in the liquid fuel mass) over a period since the start of the test. The liquid fuel mass module 122 may determine the liquid fuel mass based on the liquid fuel level indicated by the LFL signal 76 and the liquid fuel density indicated by the LFD signal 78. In one example, the liquid fuel mass module 122 sets the liquid fuel mass equal to a product of the liquid fuel level and the liquid fuel density. In various implementations, the test system 10 may include an evaporator scale (not shown) that measures the mass of the evaporator 14. In these implementations, the liquid fuel mass module 122 may subtract the evaporator mass during a test from the evaporator mass at the start of the test to obtain the mass of liquid fuel lost over a period since the start of the test.

The weathering coefficient module 124 determines a weathering coefficient of a liquid fuel in the evaporator 14. The weathering coefficient may be unique for each type of fuel (e.g., E10, E85). The weathering coefficient module 124 may determine the weathering coefficient based on the evaporator temperature indicated by the ET signal 79, the evaporator pressure indicated by the EP signal 81, the fuel vapor concentration, the mass of the liquid fuel lost since the start of a test, and the Reid vapor pressure of the liquid fuel. In one example, the weathering coefficient module 124 determines a weathering coefficient of a liquid fuel in the evaporator 14 using a relationship such as $$\emptyset_{FV} = [(T_E/310.95)*RVP*\exp(-\beta*m_l)]/P_E \quad (2)$$

where $\emptyset_{FV}$ is the fuel vapor concentration, $T_E$ is the evaporator temperature (e.g., in Kelvins), RVP is the Reid vapor pressure of the liquid fuel, $\beta$ is the weathering coefficient, $m_l$ is the mass of the liquid fuel lost since the start of a test, and $P_E$ is the evaporator pressure (e.g., in kilopascals). The Reid vapor pressure of the liquid fuel may be predetermined. The weathering coefficient module 124 outputs the weathering coefficient.

Before a test, the gas density meter 24 may measure the density of the fuel vapor mixture flowing through the fuel vapor supply line 22, and the fuel vapor concentration module 114 may determine the fuel vapor concentration based on the fuel vapor mixture density using relationship (1). In addition, the weathering coefficient module 124 may determine the weathering coefficient based on the fuel vapor concentration using relationship (2). During a test, the fuel vapor concentration module 114 may estimate the fuel vapor concentration based on the weathering coefficient, and independent of the fuel vapor mixture density, using relationship (2). Thus, the gas density meter 24 may be removed from the test system 10 during a test, which avoids contaminating the gas density meter 24.

Figure 3:
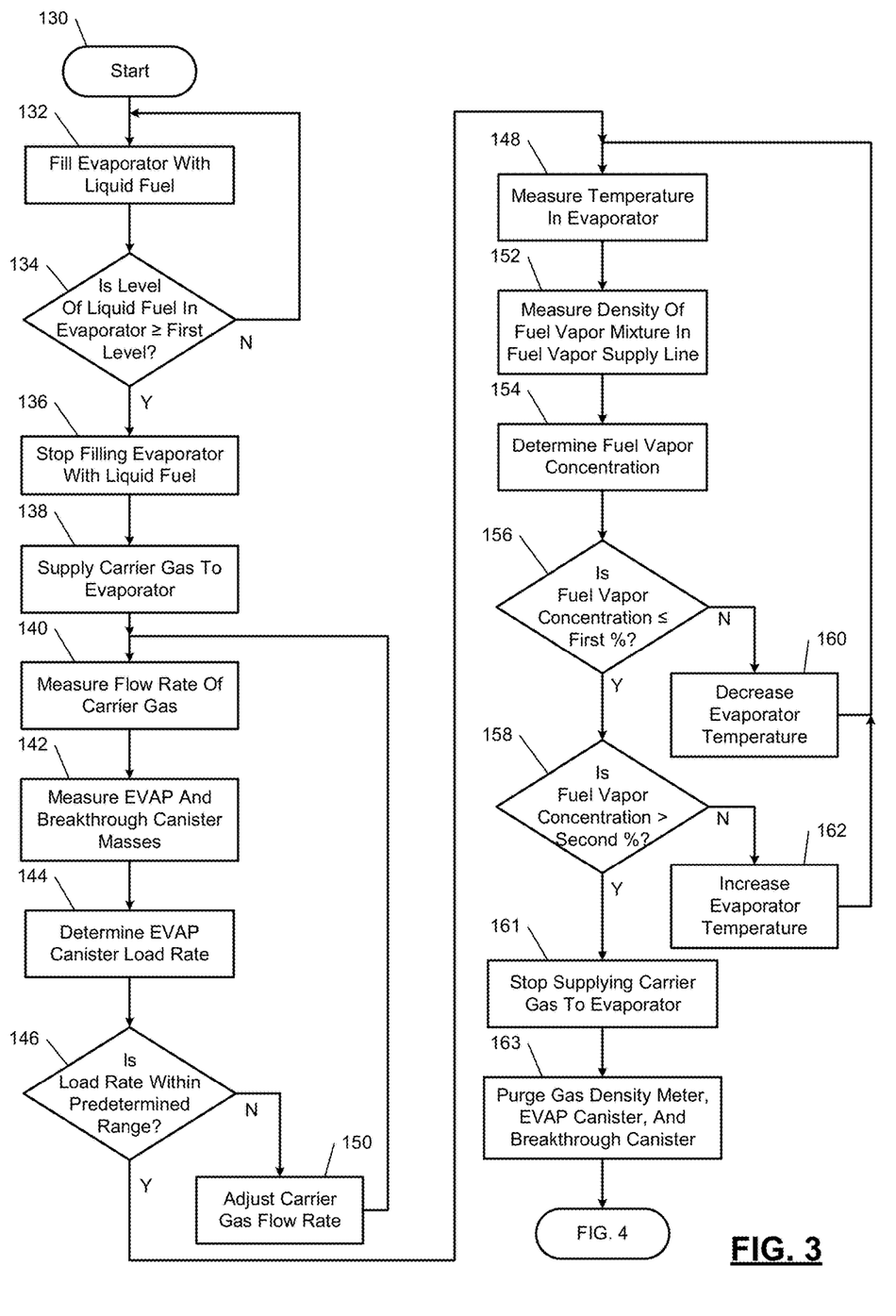
FIGS. 3 and 4 are flowcharts illustrating an example method for testing an EVAP canister of a vehicle according to the principles of the present disclosure.
Figure 4:
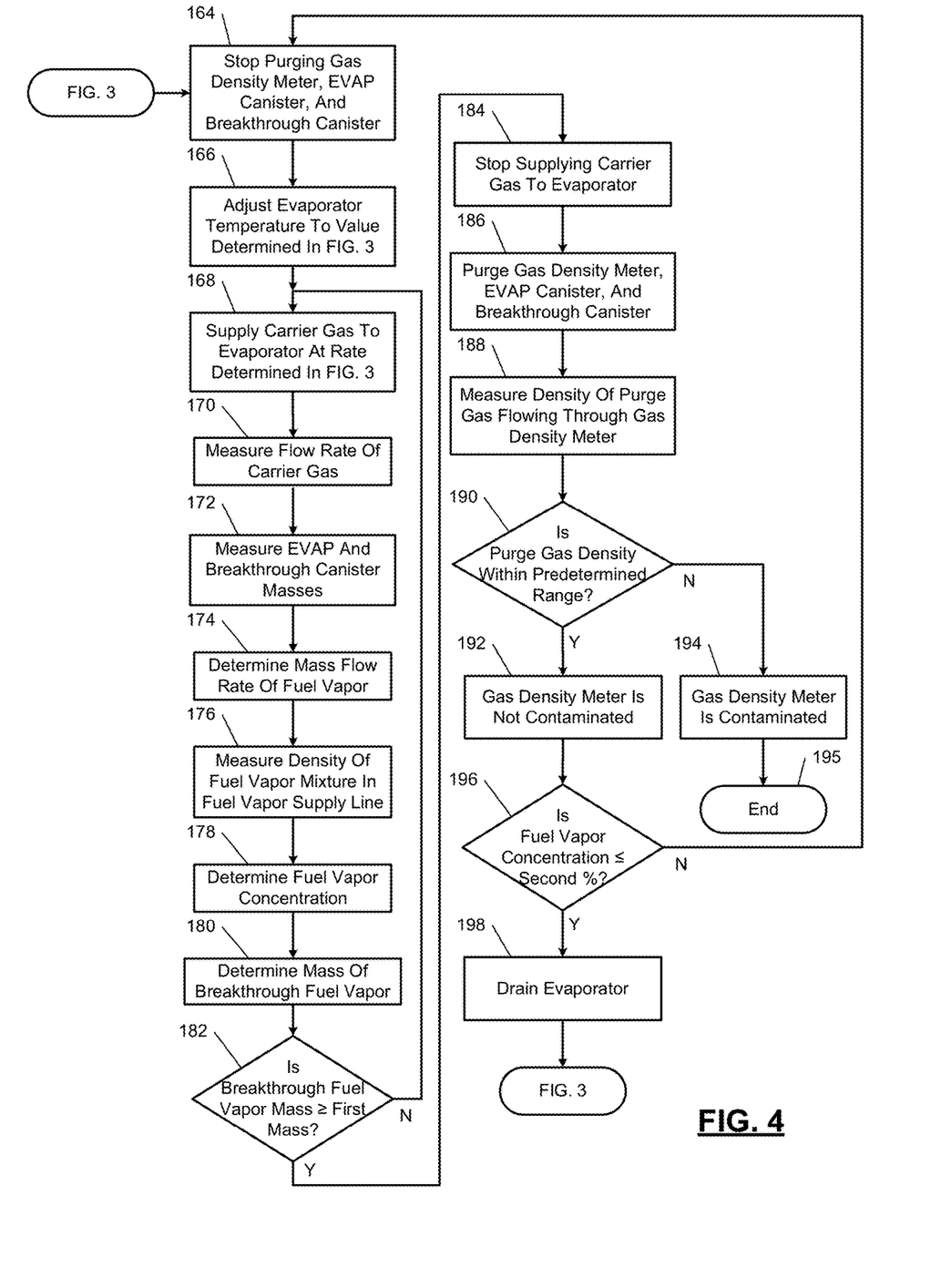

Referring now to FIGS. 3 and 4, an example method for testing the EVAP canister 12 begins at 130 of FIG. 3. The method is described in the context of the modules of FIG. 2. However, the particular modules that perform the steps of the method may be different than the modules mentioned below, or the method may be implemented apart from the modules of FIG. 2.

At 132, the valve control module 116 opens the liquid fuel supply valve 30 to fill the evaporator 14 with liquid fuel. The valve control module 116 closes the liquid fuel drain valve 32 while filling the evaporator 14 with liquid fuel. At 134, the valve control module 116 determines whether the level of liquid fuel in the evaporator 14 is greater than or equal to a first level (e.g., 2 liters), which may be predetermined. If the level of liquid fuel in the evaporator 14 is greater than or equal to the first level, the method continues at 136. Otherwise, the method continues to fill the evaporator 14 with liquid fuel at 132.

At 136, the valve control module 116 closes the liquid fuel supply valve 30 to stop filling the evaporator 14 with liquid fuel. At 138, the valve control module 116 opens the carrier gas supply valve 40 to supply carrier gas to the evaporator 14. The valve control module 116 also adjusts the first and second fuel vapor supply valves 42 and 46 to their respective first positions to allow the fuel vapor mixture to flow through the fuel vapor supply line 22.

At 140, the flow meter 38 measures the volumetric flow rate of carrier gas flowing through the carrier gas supply line 20. At 142, the EVAP canister scale 60 measures the mass of the EVAP canister 12 and/or its contents, and the breakthrough canister scale 72 measures the mass of the breakthrough canister 26 and/or its contents. At 144, the mass flow rate module 110 determines the mass flow rate of fuel vapor in the fuel vapor mixture flowing through the fuel vapor supply line 22 to the EVAP canister 12, which may be referred to at the EVAP canister load rate.

At 146, the valve control module 116 determines whether the EVAP canister load rate is within a predetermined range (e.g., 40 to 80 grams per hour). If the EVAP canister load rate is within the predetermined range, the method continues at 148. Otherwise, the method continues at 150. At 150, the method adjusts the carrier gas flow rate to bring the EVAP canister load rate within the predetermined range, and then returns to 140. The method increases the carrier gas flow rate when the EVAP canister load rate is less than the predetermined range. The method decreases the carrier gas flow rate when the EVAP canister load rate is greater than the predetermined range.

The valve control module 116 may adjust the carrier gas flow rate by adjusting the position of the carrier gas supply valve 40. For example, the valve control module 116 may increase or decrease the carrier gas flow rate by increasing or decreasing the opening percentage of the carrier gas supply valve 40, respectively. Alternatively, a blower (not shown) may provide carrier gas to the carrier gas supply line 20, and the output of the blower may be increased or decreased to increase or decrease the carrier gas flow rate, respectively.

At 148, the evaporator temperature sensor 37 measures the temperature of fuel vapor in the evaporator 14 which, as noted above, may be referred to as the evaporator temperature. At 152, the gas density meter 24 measures the density of the fuel vapor mixture flowing through the fuel vapor supply line 22. At 154, the fuel vapor concentration module 114 determines the concentration of fuel vapor in the fuel vapor supply line 22 based on the fuel vapor mixture density measured by the gas density meter 24 using relationship (1) as discussed above.

At 156, the valve control module 116 determines whether the fuel vapor concentration is less than or equal to a first percentage (e.g., 65 percent), which may be predetermined. If the fuel vapor concentration is less than or equal to the first percentage, the method continues at 158. Otherwise, the method continues at 160. At 160, the heater control module 118 decreases the evaporator temperature to decrease the fuel vapor concentration. The heater control module 118 may decrease the evaporator temperature by decreasing the amount of power supplied to a heater in the evaporator 14. After decreasing the evaporator temperature, the method returns to 148.

At 158, the valve control module 116 determines whether the fuel vapor concentration is greater than a second percentage (e.g., 35 percent), which may be predetermined. If the fuel vapor concentration is greater than the second percentage, the method continues at 161. Otherwise, the method continues at 162. At 162, the heater control module 118 increases the evaporator temperature to increase the fuel vapor concentration. The heater control module 118 may increase the evaporator temperature by increasing the amount of power supplied to a heater in the evaporator 14. After increasing the evaporator temperature, the method returns to 148.

At 161, the valve control module 116 closes the carrier gas supply valve 40 to stop supplying carrier gas to the evaporator 14. At 163, the valve control module 116 purges the gas density meter 24, the EVAP canister 12, and the breakthrough canister 26. The valve control module 116 purges the gas density meter 24 by adjusting the first and second fuel vapor supply valves 42 and 46 to their respective second positions. The valve control module 116 purges the EVAP canister 12 by opening the first purge gas supply valve 54 and the first purge gas vent valve 58. The valve control module 116 purges the breakthrough canister 26 by opening the second purge gas supply valve 66 and the second purge gas vent valve 70. The method continues at 164 of FIG. 4.

The steps shown in FIG. 3 make up the first portion of the example method for testing the EVAP canister 12, and the steps shown in FIG. 4 make up the second portion of the example method for testing the EVAP canister 12. In addition, the first portion of the example test method is a pre-test or calibration procedure for determining the values of the evaporator temperature and the carrier gas flow rate that yield a target fuel vapor concentration and a target EVAP canister load rate, respectively. Further, the second portion of the example test method is the actual test of the EVAP canister 12, which includes several cycles of loading the EVAP canister 12 with fuel vapor.

At 164 (FIG. 4), the valve control module 116 stops purging the gas density meter 24, the EVAP canister 12, and the breakthrough canister 26. The valve control module 116 stops purging the gas density meter 24 by adjusting the first and second fuel vapor supply valves 42 and 46 to their respective first positions. The valve control module 116 stops purging the EVAP canister 12 by closing the first purge gas supply valve 54 and the first purge gas vent valve 58. The valve control module 116 stops purging the breakthrough canister 26 by closing the second purge gas supply valve 66 and the second purge gas vent valve 70.

At 166, the heater control module 118 adjusts the evaporator temperature to the value determined in FIG. 3. In other words, the heater control module 118 adjusts the evaporator temperature to the value that caused the fuel vapor concentration to be less than or equal to the first percentage and greater than the second percentage. At 168, the valve control module 116 adjusts the position of the carrier gas supply valve 40 to supply carrier gas to the evaporator 14 at the rate determined in FIG. 3. In other words, the valve control module 116 adjusts the carrier gas flow rate to the value that caused the EVAP canister load rate to be within the predetermined range. The first time that 168 is executed may be considered the start of the test.

At 170, the flow meter 38 measures the volumetric flow rate of carrier gas flowing through the carrier gas supply line 20. At 172, the EVAP canister scale 60 measures the mass of the EVAP canister 12 and/or its contents, and the breakthrough canister scale 72 measures the mass of the breakthrough canister 26 and/or its contents. At 174, the mass flow rate module 110 determines the mass flow rate of fuel vapor flowing through the fuel vapor supply line 22 based on the EVAP canister mass and the breakthrough canister mass as discussed above.

At 176, the gas density meter 24 measures the density of the fuel vapor mixture flowing through the fuel vapor supply line 22. At 178, the fuel vapor concentration module 114 determines the concentration of fuel vapor in the fuel vapor supply line 22 based on the fuel vapor mixture density measured by the gas density meter 24 using relationship (1) as discussed above. In various implementations, instead of measuring the fuel vapor mixture density and determining the fuel vapor concentration based thereon, the method may estimate the fuel vapor concentration based on the weathering coefficient using relationship (2). In these implementations, the gas density meter 24 may be removed from the test system 10 during the test.

At 180, the fuel vapor mass module 112 determines the mass of breakthrough fuel vapor (i.e., fuel vapor in the breakthrough canister 26) based on the breakthrough canister mass as discussed above. At 182, the valve control module 116 determines whether the breakthrough fuel vapor mass is greater than or equal to a first mass (e.g., 2 grams), which may be predetermined. If the breakthrough fuel vapor mass is greater than or equal to the first mass, the method continues at 184. Otherwise, the method returns to 168 and the valve control module 116 continues to supply carrier gas to the evaporator 14.

At 184, the valve control module 116 closes the carrier gas supply valve 40 to stop supplying carrier gas to the evaporator 14. At 186, the valve control module 116 purges the gas density meter 24, the EVAP canister 12, and the breakthrough canister 26. At 188, the gas density meter 24 measures the density of purge gas flowing through the fuel vapor supply line 22.

At 190, the contamination detection module 120 determines whether the purge gas density is within an expected or predetermined range. The predetermined range may be unique for each type of purge gas (e.g., air, nitrogen). If the purge gas density is within the predetermined range, the contamination detection module 120 determines that the gas density meter 24 is not contaminated at 192, and the method continues at 196. Otherwise, the contamination detection module 120 determines that the gas density meter 24 is contaminated at 194, and the method and the test end at 195. In implementations where the fuel vapor concentration is estimated based on the weathering coefficient, 188 to 194 may be omitted, and the method may continue directly to 196 from 186.

At 196, the valve control module 116 determines whether the fuel vapor concentration is less than or equal to a second percentage (e.g., 35 percent), which may be predetermined. If the fuel vapor concentration is less than or equal to the second percentage, the method continues at 198. Otherwise, the method returns to 164. At 198, the valve control module 116 opens the liquid fuel drain valve 32 to drain liquid fuel from the EVAP canister 12, and then the method continues at 132 of FIG. 3. In various implementations, instead of draining and refilling the evaporator 14, the valve control module 116 may simply refill the evaporator 14 to the first level without draining the evaporator 14 in order to reduce fuel costs.

During each cycle of the test, the valve control module 116 supplies fuel vapor to the EVAP canister 12 until the mass of the breakthrough fuel vapor is greater than or equal to the first mass. Thus, each cycle may start at 168 and may end at 184. Between consecutive cycles of the test, the valve control module 116 purges the gas density meter 24, the EVAP canister 12, and the breakthrough canister 26. Thus, 186 to 196 may take place between consecutive cycles of the test. As indicated in FIG. 4, the valve control module 116 may continue to execute cycles until the fuel vapor concentration is less than or equal to the second percentage. In this regard, the valve control module 116 determines the number of cycles that are executed during the test.

Figure 5:
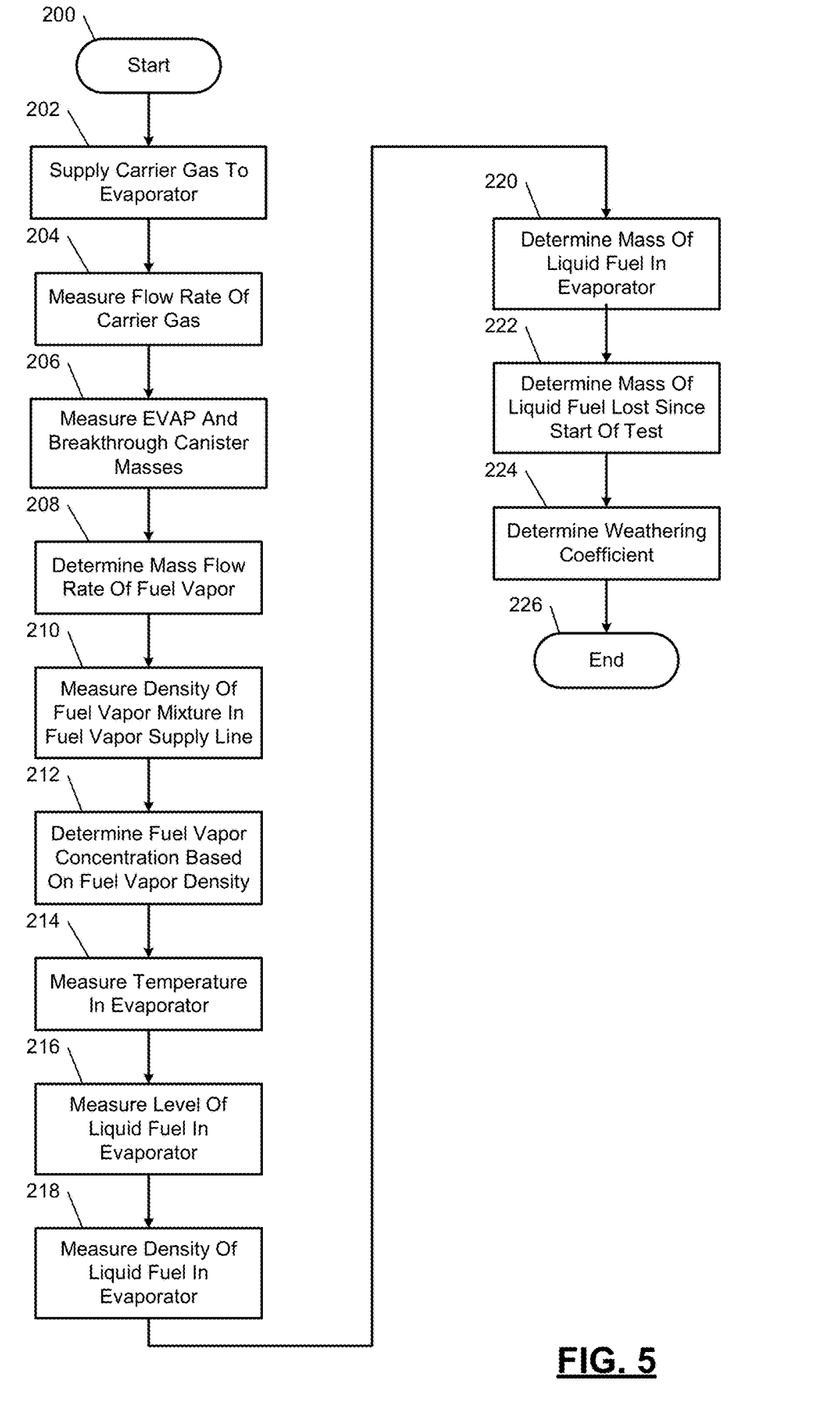
FIG. 5 is a flowchart illustrating an example method for determining a weathering coefficient of a liquid fuel according to the principles of the present disclosure.

Referring now to FIG. 5, an example method for estimating the weathering coefficient of a liquid fuel begins at 200. The method is described in the context of the modules of FIG. 2. However, the particular modules that perform the steps of the method may be different than the modules mentioned below, or the method may be implemented apart from the modules of FIG. 2.

At 202, the valve control module 116 opens the carrier gas supply valve 40 to supply carrier gas to the evaporator 14. At 204, the flow meter 38 measures the volumetric flow rate of carrier gas flowing through the carrier gas supply line 20. At 206, the EVAP canister scale 60 measures the mass of the EVAP canister 12 and/or its contents, and the breakthrough canister scale 72 measures the mass of the breakthrough canister 26 and/or its contents.

At 208, the mass flow rate module 110 determines the mass flow rate of the fuel vapor flowing through the fuel vapor supply line based on the EVAP canister mass and the breakthrough canister mass as discussed above. At 210, the gas density meter 24 measures the density of the fuel vapor mixture flowing through the fuel vapor supply line 22. At 212, the fuel vapor concentration module 114 determines the concentration of fuel vapor in the fuel vapor supply line 22 based on the fuel vapor mixture density. This fuel vapor concentration may be referred to as the actual fuel vapor concentration.

At 214, the evaporator temperature sensor 37 measures the temperature of fuel vapor in the evaporator 14. At 216, the liquid fuel level sensor 34 measures the level of liquid fuel in the evaporator 14. At 218, the liquid fuel density sensor 34 measures the density of liquid fuel in the evaporator 14.

At 220, the liquid fuel mass module 122 determines the mass of liquid fuel in the evaporator 14 based on the liquid fuel level and the liquid fuel density as discussed above. At 222, the liquid fuel mass module 122 determines the mass of liquid fuel lost from the evaporator 14 since the start of a test and/or since the evaporator 14 was last filled with liquid fuel. At 224, the weathering coefficient module 124 determines the weathering coefficient based on the evaporator temperature, the evaporator pressure, the fuel vapor concentration, the liquid fuel mass lost, and the Reid vapor pressure of the liquid fuel using relationship (2) as discussed above. The method ends at 226.

The weathering coefficient module 124 may determine the weathering coefficient by inserting the actual fuel vapor concentration into relationship (2) and solving for the weathering coefficient. Alternatively, the weathering coefficient module 124 may insert an estimate of the weathering coefficient into relationship (2) to obtain an estimate of the fuel vapor coefficient. The weathering coefficient module 124 may then compare the estimated and actual fuel vapor concentrations, and adjust the estimated weathering coefficient in an iterative manner until the difference between the estimated and actual fuel vapor coefficients is within a predetermined range.

The method of FIG. 5 may be executed for various types of fuels and, as a result, the weathering coefficient module 124 may store a library of weathering coefficients for various types of fuels. The weathering coefficient module 124 may identify the type of fuel used during a test based on the liquid fuel density indicated by the LFD signal 78. Alternatively, a user may inform the weathering coefficient module 124 of the type of fuel used during a test using a user interface device (not shown).

The method of FIG. 5 may be executed when a weathering coefficient for the type of fuel used during a test is not stored in the weathering coefficient module 124. If a weathering coefficient for the type of fuel used during a test is stored in the weathering coefficient module 124, the example test method of FIGS. 3 and 4 may be executed by estimating the fuel vapor concentration based on the weathering coefficient.

The method of FIG. 5 may be executed in conjunction with or separate from the example test method of FIGS. 3 and 4. In one example, the method of FIG. 5 may be executed before a test (e.g., during the portion of the example test method shown in FIG. 3), and the weathering coefficient determined using the method of FIG. 5 may be used to estimate the fuel vapor coefficient during the test. Thus, the gas density meter 24 may be removed from the test system 10 during the test. If the method of FIG. 5 is performed before a test, the weathering coefficient may be determined based on the mass of fuel vapor lost since the start of the pre-test or calibration procedure and/or since the evaporator 14 was last filled with liquid fuel.

In another example, the method of FIG. 5 may be executed during a test (e.g., during the portion of the example test method shown in FIG. 4) using one type of fuel, and the weathering coefficient determined using the method of FIG. 5 may be used to estimate the fuel vapor coefficient during a subsequent test using the same type of fuel. Thus, the gas density meter 24 may be removed from the test system 10 during the subsequent test. If the method of FIG. 5 is performed during a test, the weathering coefficient may be determined based on the mass of fuel vapor lost since the start of the test and/or since the evaporator 14 was last filled with liquid fuel.

If the method of FIG. 5 is executed in conjunction with the example test method of FIGS. 3 and 4, similar steps of the two methods may be combined. For example, 202 of FIG. 5 may be combined with 138 of FIGS. 3 and/or 168 of FIG. 4, 204 of FIG. 5 may be combined with 140 of FIGS. 3 and/or 170 of FIG. 4, 206 of FIG. 3 may be combined with 142 of FIGS. 3 and/or 172 of FIG. 4, 208 of FIG. 5 may be combined with 144 of FIGS. 3 and/or 174 of FIG. 4, 210 of FIG. 5 may be combined with 152 of FIGS. 3 and/or 176 of FIG. 4, 212 of FIG. 5 may be combined with 154 of FIGS. 3 and/or 178 of FIGS. 4, and/or 214 of FIG. 5 may be combined with 148 of FIG. 3.

Figure 6:
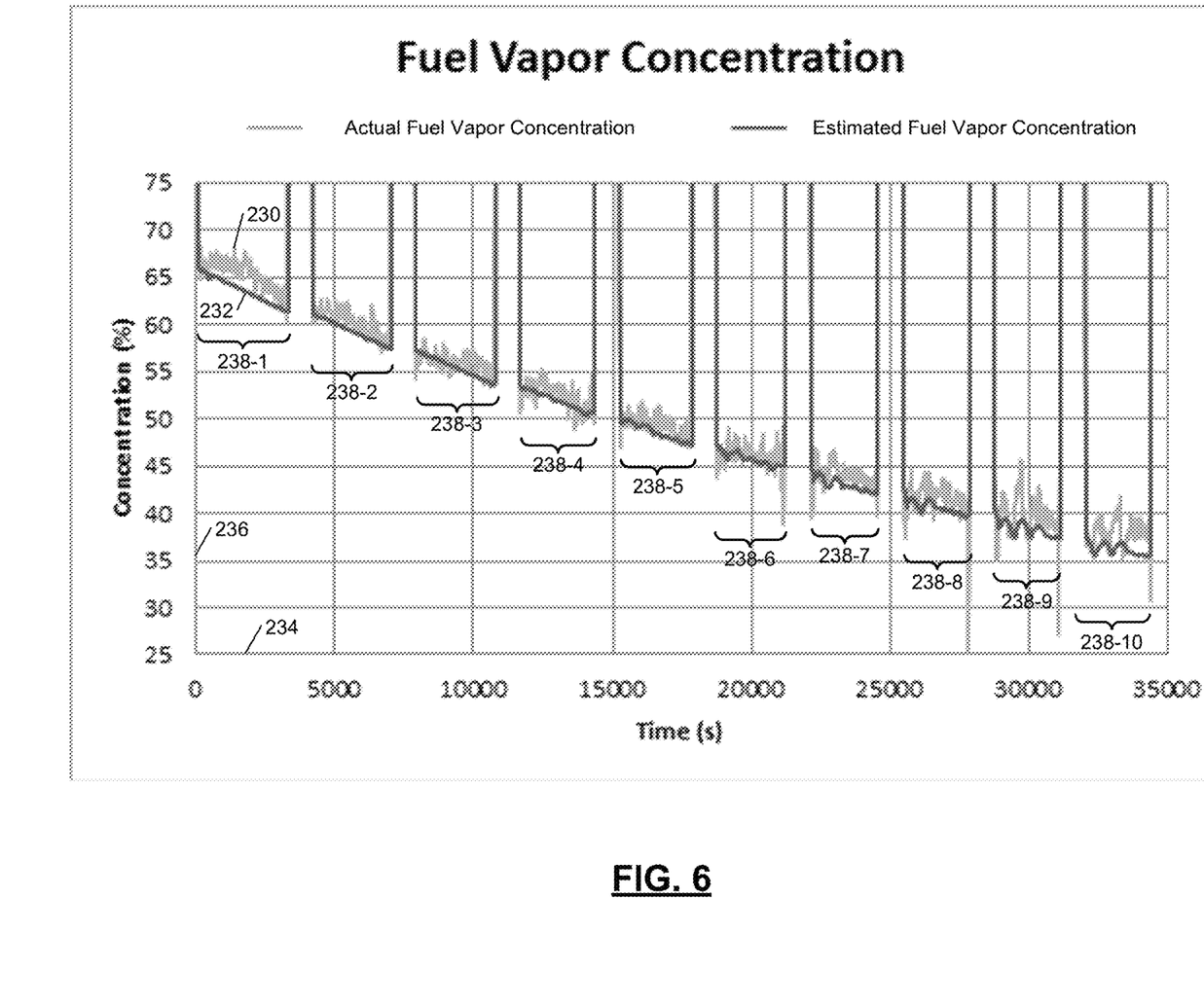
FIG. 6 is a graph illustrating example measured and estimated fuel vapor concentrations in an EVAP canister during a canister loading test according to the principles of the present disclosure.

Referring now to FIG. 6, an actual fuel vapor concentration 230 determined based on the fuel vapor mixture density from the gas density meter 24 and a fuel vapor concentration 232 estimated using the weathering coefficient are illustrated. The actual and estimated fuel vapor concentrations 230 and 232 are plotted with respect to an x-axis 234 representing time in seconds and a y-axis 236 representing concentration in percent. The timeline represented by the x-axis 234 corresponds to the period of a test.

The test includes a plurality of cycles 238 during which the EVAP canister 12 is loaded with fuel vapor from the evaporator 14. The cycles 238 include a first cycle 238-1, a second cycle 238-2, a third cycle 238-3, a fourth cycle 238-4, a fifth cycle 238-5, a sixth cycle 238-6, a seventh cycle 238-7, an eighth cycle 238-8, a ninth cycle 238-9, and a tenth cycle 238-10. As shown in FIG. 6, the estimated fuel vapor concentration 232 closely tracks the actual fuel vapor concentration 230. In addition, the actual and estimated fuel vapor concentrations 230 and 232 steadily decrease over the period of the test due to the mass of fuel lost from the evaporator 14 since the start of the test.

Figure 7:
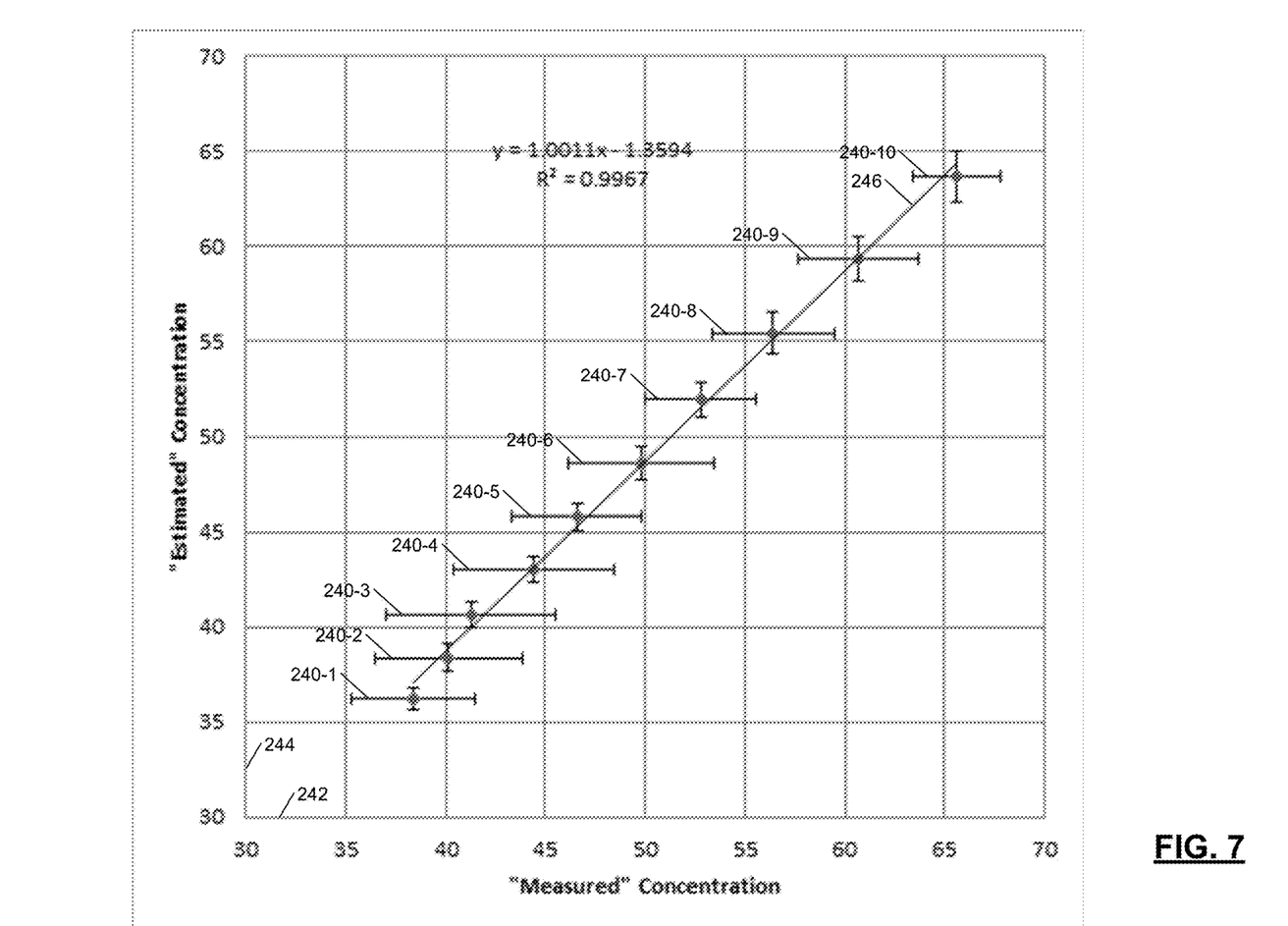
FIG. 7 is a graph illustrating a linear comparison of the example measured and estimated fuel vapor concentrations.

Referring now to FIG. 7, a linear comparison of the actual and estimated fuel vapor concentrations 230 and 232 is illustrated. The linear comparison of the actual and estimated fuel vapor concentrations 230 and 232 includes a plurality of bands 240 that each represent the deviation between the actual and estimated fuel vapor concentrations 230 and 232 during one the cycles 238. The bands 240 are plotted with respect to an x-axis 242 representing the actual fuel vapor concentration 230 in percent and a y-axis 244 representing the estimated fuel vapor concentration 232 in percent. The actual fuel vapor concentration 230 is referred to as a "measured" concentration in FIG. 7 since it is determined based on a measured value of the fuel vapor mixture density.

The bands 240 include a first band 240-1 that corresponds to the first cycle 238-1, a second band 240-2 that corresponds to the second cycle 238-2, a third band 240-3 that corresponds to the third cycle 238-3, and a fourth band 240-4 that corresponds to the fourth cycle 238-4. The bands 240 also include a fifth band 240-5 that corresponds to the fifth cycle 238-5, a sixth band 240-6 that corresponds to the sixth cycle 238-6, and a seventh band 240-7 that corresponds to the seventh cycle 238-7. The bands 240 further include an eighth band 240-8 that corresponds to the eighth cycle 238-8, a ninth band 240-9 that corresponds to the ninth cycle 238-9, and a tenth band 240-10 that corresponds to the tenth cycle 238-10.

The linear comparison of the actual and estimated fuel vapor concentrations 230 and 232 also includes a linear regression line 246 that is plotted with respect to the x-axis 242 and the y-axis 244. The characteristics of the linear regression line 246 indicate that the actual and estimated fuel vapor concentrations 230 and 232 have a correlation coefficient of 0.997 and a standard error of 0.561. Thus, the linear regression line 246 is objective evidence indicating that the estimated fuel vapor concentration 232 correlates very well with the actual fuel vapor concentration 230.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for testing an evaporative emissions (EVAP) canister of a vehicle, the method comprising:
providing an evaporator containing liquid fuel;
providing a fuel vapor supply line configured to deliver a mixture of fuel vapor and carrier gas from the evaporator to the EVAP canister;
providing a fuel vapor supply valve in the fuel vapor supply line;
measuring a density of the fuel vapor mixture flowing through the fuel vapor supply line via a gas density meter; and
controlling via a valve control module a position of the fuel vapor supply valve to adjust a flow of the fuel vapor mixture from the evaporator to the EVAP canister based on the fuel vapor mixture density.

2. The method of claim 1, further comprising (i) determining a concentration of fuel vapor in the fuel vapor mixture via a fuel vapor concentration module based on the fuel vapor mixture density and (ii) controlling a position of the fuel vapor supply valve via the valve control module based on the fuel vapor concentration.

3. The method of claim 2, further comprising adjusting the position of the fuel vapor supply valve via the valve control module to supply the fuel vapor mixture to the EVAP canister during N cycles of a canister test, wherein N is an integer greater than one; and determining N based on the fuel vapor concentration.

4. The method of claim 3, further comprising opening the fuel vapor supply valve to start the N cycles when the fuel vapor concentration is less than or equal to a first predetermined percentage.

5. The method of claim 4, further comprising closing the fuel vapor supply valve to end the N cycles when the fuel vapor concentration is less than or equal to a second predetermined percentage.

6. The method of claim 5, further comprising draining liquid fuel from the evaporator via a liquid fuel drain line by opening a liquid fuel drain valve disposed in the liquid fuel drain line when the fuel vapor concentration is less than or equal to the second predetermined percentage.

7. The method of claim 3, further comprising (i) delivering the fuel vapor mixture from the EVAP canister to a breakthrough canister via a fuel vapor breakthrough line, (ii) measuring a mass of the breakthrough canister including contents thereof via a breakthrough canister scale, and (iii) determining via a fuel vapor mass module a mass of fuel vapor in the breakthrough canister based on the breakthrough canister mass, the valve control module being configured to close the fuel vapor supply valve to end each of the N cycles when the fuel vapor mass is greater than or equal to a predetermined mass.

8. The method of claim 7, further comprising (i) measuring a mass of the EVAP canister including contents thereof via an EVAP canister scale and (ii) determining via a mass flow rate module a mass flow rate of fuel vapor flowing through the fuel vapor supply line based on the breakthrough canister mass and the EVAP canister mass, the fuel vapor concentration module being configured to determine the fuel vapor concentration further based on the fuel vapor mass flow rate.

9. The method of claim 8, further comprising (i) supplying the carrier gas to the evaporator via a carrier gas supply line and (ii) measuring via a flow meter a volumetric flow rate of the carrier gas flowing through the carrier gas supply line, the fuel vapor concentration module being configured to determine the fuel vapor concentration further based on the carrier gas volumetric flow rate and a density of the carrier gas.

10. The method of claim 3, further comprising controlling the position of the fuel vapor supply valve to prevent the flow of the fuel vapor mixture through the fuel vapor supply line and to allow a purge gas to flow through the fuel vapor supply line to purge the gas density meter between consecutive ones of the N cycles.

11. The method of claim 10, further comprising measuring a density of the purge gas via a gas density meter and determining via a contamination detection module that the gas density meter is contaminated when the purge gas density is outside of a predetermined range.

12. A method of performing a test on an evaporative emissions (EVAP) canister of a vehicle, the method comprising:

providing an evaporator configured to contain liquid fuel;

providing a fuel vapor supply line configured to deliver a mixture of fuel vapor and a carrier gas from the evaporator to the EVAP canister;

providing a fuel vapor supply valve disposed in the fuel vapor supply line;

estimating via a fuel vapor concentration module a concentration of fuel vapor in the fuel vapor mixture flowing through the fuel vapor supply line; and controlling via a valve control module a position of the fuel vapor supply valve to adjust a flow of the fuel vapor mixture from the evaporator to the EVAP canister based on the fuel vapor concentration.

13. The method of claim 12, further comprising determining a weathering coefficient of liquid fuel in the evaporator via a weathering coefficient module, the fuel vapor concentration module being configured to estimate the fuel vapor concentration based on the weathering coefficient.

14. The method of claim 13, further comprising estimating the fuel vapor concentration further based on a temperature of liquid fuel in the evaporator, a Reid vapor pressure of liquid fuel in the evaporator, a decrease in a mass of liquid fuel in the evaporator over a period since a start of the test, and a pressure in the evaporator.

15. The method of claim 14, further comprising measuring a mass of the evaporator via an evaporator scale and determining via a liquid fuel mass module the decrease in the mass of liquid fuel in the evaporator over the period since the start of the test based on the evaporator mass.

16. The method of claim 14, further comprising (i) measuring a level of liquid fuel in the evaporator via a liquid fuel level sensor, (ii) measuring a density of liquid fuel in the evaporator via a liquid fuel density sensor, and (iii) determining via a liquid fuel mass module a decrease in the mass of liquid fuel in the evaporator over the period since the start of the test based on the liquid fuel level and the liquid fuel density.

17. The method of claim 13, further comprising measuring via a gas density meter a density of the fuel vapor mixture flowing through the fuel vapor supply line, the weathering coefficient module being configured to determine the weathering coefficient based on the fuel vapor mixture density.

18. The method of claim 17, further comprising determining the weathering coefficient further based on a temperature of liquid fuel in the evaporator, a Reid vapor pressure of liquid fuel in the evaporator, a decrease in a mass of liquid fuel in the evaporator over a period since a start of the test, and a pressure in the evaporator.

19. The method of claim 17, further comprising (i) determining the fuel vapor concentration before the test based on the fuel vapor mixture density and (ii) determining the weathering coefficient based on the fuel vapor mixture density determined before the test.

20. The method of claim 19, further comprising estimating by the fuel vapor concentration module the fuel vapor concentration during the test based on the weathering coefficient and independent of the fuel vapor mixture density.

* * * * *